United States Patent [19]
Hills

[11] 3,789,874
[45] Feb. 5, 1974

[54] CHANGING BIAS CHECK VALVE

[75] Inventor: David A. Hills, Abington, Mass.

[73] Assignee: Hersey Products Inc., Dedham, Mass.

[22] Filed: July 13, 1972

[21] Appl. No.: 271,625

[52] U.S. Cl................. 137/527, 137/531, 251/303, 251/263
[51] Int. Cl............................................ F16k 15/03
[58] Field of Search ..... 137/527, 527.4, 527.6, 530, 137/531; 251/298, 299, 303, 251, 262, 263

[56]  References Cited
UNITED STATES PATENTS

| | | | |
|---|---|---|---|
| 3,478,778 | 11/1969 | Curtiss et al.................. | 137/530 X |
| 3,334,858 | 8/1967 | Hay............................... | 251/298 X |
| 980,188 | 1/1911 | Blauvelt......................... | 137/527 X |

FOREIGN PATENTS OR APPLICATIONS

| | | | |
|---|---|---|---|
| 449,531 | 6/1949 | Italy................................... | 251/303 |

Primary Examiner—William R. Cline

[57] ABSTRACT

A check valve in which clapper bias torque diminishes as the clapper opens, a clapper support carrying pivotally mounted thereon a clapper assembly and (pivotally mounted intermediately thereof) a cam arm, a compression spring extending between the clapper support and one end of the cam arm causing the other end of the cam arm to impose a bias force on the clapper assembly, the bias force being imposed along a plane defined by a transverse line near said other end of the cam arm and a transverse line on the clapper assembly. In a preferred embodiment the force is imposed from a stainless steel roller rotatably mounted in said other end of the cam arm to a plastic roller rotatably mounted at the downstream end of the clapper assembly.

8 Claims, 2 Drawing Figures

PATENTED FEB 5 1974 3,789,874

CHANGING BIAS CHECK VALVE

SUMMARY OF THE INVENTION

The invention provides a check valve in which the force tending to bias the clapper in a closed direction may be predeterminedly related to flow conditions in the check valve to obtain a desired curve of flow rate versus pressure drop over the range of operating conditions and which is at the same time extremely practical to manufacture and reliable in use. The invention is characterized by a cam arm pivotally mounted centrally thereof on the clapper support, a compression spring urging one end of the cam arm away from the clapper support, and means transmitting force along a plane extending through a line transverse of the cam arm toward the other end thereof and through a line transverse of the clapper assembly to tend to bias the clapper in a closed direction. In a preferred embodiment, the spring applies its force to the end of the cam arm through a spring engagement bushing mounted on said cam arm pivotally about a transverse axis, and a rotatable roller at the other end of said cam arm engages a rotatable roller on the clapper assembly.

BACKGROUND OF THE INVENTION

This invention relates to check valves.

It is known in the art that it is desirable, in a check valve, to provide for modifying the force tending to bias the clapper in a closed direction as flow condition in the valve varies. Thus, in Curtiss et al. U.S. Pat. No. 3,478,778, "Clapper Valve with Changing Bias," granted to the assignee of the present invention on Nov. 18, 1969, a tension spring was used to bias a cam arm, and a diminishing torque tending to bias the clapper in a closed direction was exerted as the clapper opened further because the moment arm through which the spring's force was exerted on the clapper decreased as the clapper opened.

It is also recognized that a check valve should be capable of being reliably and reproducibly manufactured under production conditions, and should be reliable in use.

DESCRIPTION OF THE PREFERRED EMBODIMENT

Figure 1:
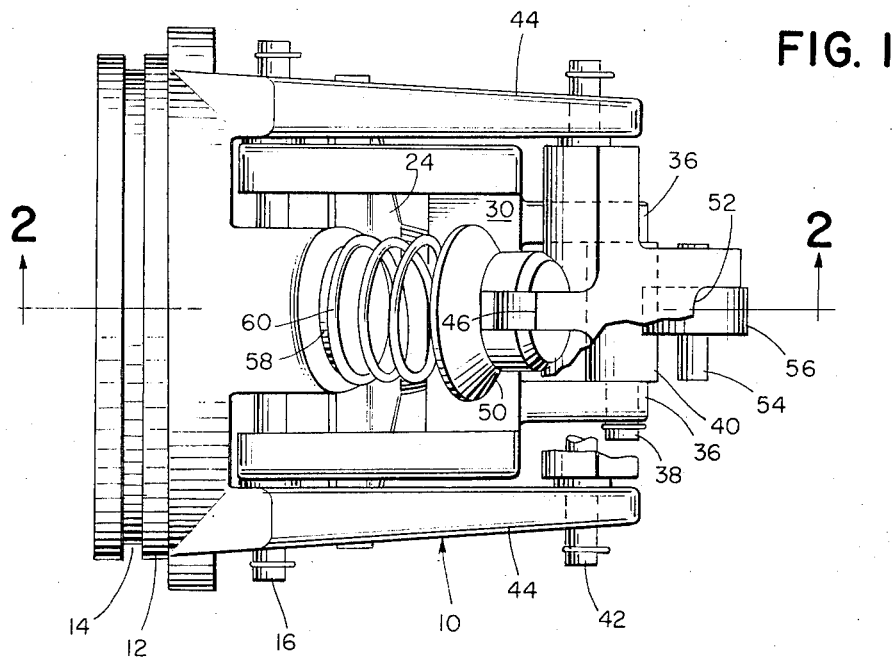
FIG. 1 is a plan view of the presently preferred embodiment of the invention.
Figure 2:
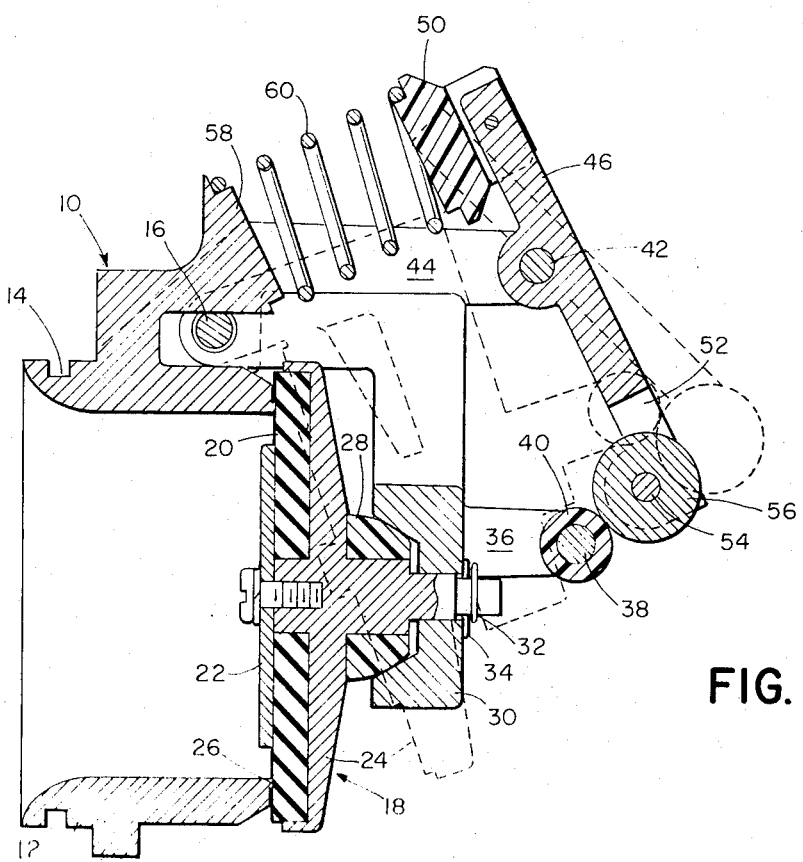
FIG. 2 is a sectional view taken at 2—2 of FIG. 1.

There is shown in FIGS. 1 and 2 a clapper support 10 provided with a flange 12 carrying an O-ring groove 14 for engaging hardware upstream thereof in use.

Pivotally mounted in the clapper support 10 on transverse shaft 16 is a clapper assembly indicated generally at 18.

The clapper assembly 18 includes a rubber annulus 20 secured by a washer 22. The clapper 24 has some universal movement relative to the valve seat 26 owing to provision of the plastic bushing 28 which is slidably angularly moveable relative to the clapper arm 30, the snap ring 32 and washer 34 being accordingly positioned. A pair of arms 36 extending in a downstream direction from the clapper support 30 carry a shaft 38 on which is rotatably mounted a plastic roller 40.

Rotatably mounted on shaft 42 carried in arms 44 of clapper support 10 is cam arm 46. Pivotally mounted at the upper end of cam arm 46, on lateral shaft 48, is plastic spring engagement bushing 50. Rotatably mounted in slot 52 at the other end of cam arm 46, on transverse shaft 54, is stainless steel cam roller 56.

Extending between a spring support portion 58 of the clapper support 10 and the bushing 50 is compression spring 60.

In operation, in closed position the force exerted by compression spring 60 tends to bias cam arm 46 about the transverse axis of shaft 42. Accordingly, the roller 56 exerts force against the roller 38 to hold the clapper rubber 20 against the valve seat 26. Because the rollers 56 and 40 have cylindrical surfaces, the force exerted by the former on the latter is exerted along the plane defined by the transverse axes of the shafts 54 and 38, as is true not only in the closed position of the check valve but in all its positions. As water pressure rises sufficiently to crack and then increasingly open the check valve, the cam arm 46 pivots about the shaft 42 toward the position indicated in the dahsed lines. As movement in that direction takes place, the effective moment arm of the plane connecting the axes of the rollers about the axis of the shaft 16 decreases considerably, so as to have much more effect on the torque being exerted on the clapper assembly than does the fact that the force exerted by spring 60 incrases owing to additional compression. In the preferred embodiment, the diminishing torque is effective to maintain the curve of pressure drop versus flow rate approximately flat throughout the entire operating range of 0 flow to rated maximum capacity flow, although lever arms and spring characteristics and other parameters familiar to the art may be varied so as to change the direction of the curve just referred to as desired.

Other embodiments within the invention will be apparent to those skilled in the art.

What is claimed is:

1. A check valve comprising:
   a clapper support,
   a clapper assembly rotatably mounted on said clapper support,
   a cam arm rotatably mounted intermediately thereof on said clapper support,
   a compression spring extending between said clapper support and a first end of said cam arm, and
   means securing said cam arm toward the other end thereof to said clapper assembly so that force is applied from said cam arm to said clapper assembly through a plane passing through an axis transverse of said cam arm toward said other end thereof and through an axis transverse of said clapper assembly wherein a cylindrical cam surface at said other end of said cam arm is urged against a cylindrical surface carried by said clapper assembly owing to the force on said cam arm from said compression spring.

2. The check valve of claim 1 in which said cylindrical cam surface is the surface of a cylindrical element carried by said cam arm.

3. The check valve of claim 2 in which said cylindrical element is rotatably mounted on said cam arm for rotation about said axis transverse of said cam arm.

4. The check valve of claim 1 in which said cylindrical surface is the surface of a cylindrical clapper assembly element carried by said clapper assembly.

5. The check valve of claim 4 in which said cylindrical clapper assembly element is rotatably mounted on said clapper assembly for rotation about said axis transverse of said clapper assembly.

6. The check valve of claim 1 in which said cylindrical cam surface is the surface of a cylindrical element rotatably mounted on said cam arm for rotation about said axis transverse of said cam arm, said cylindrical surface is the surface of a cylindrical clapper assembly element rotatably mounted on said clapper assembly for rotation about said axis transverse of said clapper assembly, and one of said cylindrical elements is plastic and the other thereof is stainless steel.

7. The check valve of claim 6 in which said clapper assembly cylindrical element is plastic.

8. The check valve of claim 6 in which said cam arm carries at said first end a spring engaging bushing engaging said compression spring, said spring engaging bushing being pivotally mounted on said cam arm to pivot about an axis transverse thereof.

* * * * *